(12) United States Patent
Nishikawa et al.

(10) Patent No.: US 6,597,572 B2
(45) Date of Patent: Jul. 22, 2003

(54) DC POWER SOURCE UNIT WITH BATTERY RECHARGING FUNCTION

(75) Inventors: Tomomasa Nishikawa, Hitachinaka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/117,326

(22) Filed: Apr. 8, 2002

(65) Prior Publication Data

US 2002/0158516 A1 Oct. 31, 2002

(30) Foreign Application Priority Data

Apr. 6, 2001 (JP) .................................. P2001-108077

(51) Int. Cl.[7] .................................................. H05K 7/20
(52) U.S. Cl. ...................... 361/695; 320/107; 320/150; 429/82; 429/99; 361/679
(58) Field of Search ........................ 165/80.4; 320/107, 320/112–117, 108, 147, 150, 156; 361/600, 679, 688–695, 715; 429/82, 97–100

(56) References Cited

U.S. PATENT DOCUMENTS 6,218,807 B1 * 4/2001 Sakaue et al. ............... 320/107
6,342,773 B2 * 1/2002 Sakaue et al. ............... 320/107
6,373,228 B1 * 4/2002 Sakakibara .................. 320/150

* cited by examiner

Primary Examiner—Gregory Thompson
(74) Attorney, Agent, or Firm—Sughrue Mion, PLLC

(57) ABSTRACT

In a DC power source unit that can selectively charge a battery pack and supply DC power to a cordless power tool through an adaptor shaped like the battery pack, a battery pack insertion space, into which the battery pack is inserted to charge, is substantially sealed or closed so as not to be in fluid communication with the inner space in which the circuit components are disposed. Cooling air for cooling the circuit components are not disturbed by disturbing air flow which may otherwise be created if the battery pack insertion space is not sealed.

8 Claims, 2 Drawing Sheets

DC POWER SOURCE UNIT WITH BATTERY RECHARGING FUNCTION

BACKGROUND OF THE INVENTION

1. Field of the Invention

The present invention relates to a DC power source unit that can selectively charge a battery pack, which is used as a power source for a cordless power tool, and supply DC power to the cordless power tool through an adaptor shaped like the battery pack.

2. Description of the Related Art

Cordless power tools are convenient because they can be used anywhere without being restricted by the length of a power cable. However, because the capacity of the battery is limited, the length of time that the power tool can be used is also limited. U.S. Pat. No. 6,172,860 (corresponding to DE-OS 19844426 A1) and Japanese Patent Publication (A) No. 11-101836 (corresponding to a co-pending U.S. application Ser. No. 09/478,798) disclose DC power source units that can be used for cordless power tools, in which DC power is continuously supplied to the power tool via an adapter. The DC power source unit can be used along with the battery pack.

Japanese Patent Publication (A) No. 2000-184614discloses a DC power source unit with a battery pack charging function, which will be described in more detail while referring to FIG. 1. A power tool 20 is operable with a battery pack 19 that has a shape insertable into a handgrip of the power tool 20. The power tool 20 is also operable with an adapter 18 that has a substantially same shape as the battery pack 19. The adapter 18 is connected to a DC power source unit 17 via a cord 22, and the DC power source unit 17 is connected, while in use, to a commercial AC power source via a cord 15 and a plug 14. The DC power source unit 17 supplies DC power to the power tool 20 when the adapter 18 is used instead of the battery pack 19.

The DC power source unit 17 is accommodated in a rectangular box having a top wall, side walls, and a bottom wall. The top wall is formed with a battery pack insertion hole 8, into which the battery pack 19 is inserted for charging.

The DC power source unit 17 is being operated not only during charging the battery pack 19 but also during supplying DC power to the power tool 20. Accordingly, a large amount of heat is generated from the circuit components contained in the DC power source unit 17, however, no proposal has ever been made for dissipating the heat.

SUMMARY OF THE INVENTION

The most conceivable solution for dissipating the heat and cooling the circuit components in the DC power source unit would be providing a cooling system. If, as shown in FIG. 2, cooling air inlet holes 3 are formed in one side wall of the rectangular box 7, air outlet holes 21 in the opposite side wall, and a cooling fan 1 is fixed to the inner surface of the side wall in which the air outlet holes 21 are formed, then circuit components 25 mounted on fins 2 would be cooled by air introduced from the air inlet holes 3

However, the air flows through the box 7 in different patterns depending upon whether or not the battery pack 19 is inserted into the insertion hole 81 because terminal holes 4 are formed in positions below the battery pack insertion hole 8. When the battery pack 19 is not inserted into the insertion hole 8, the air Introduced through the battery pack insertion hole 8 and the terminal holes 4 flows in patterns 6 out through the air outlet holes 21 in addition to the air introduced through the air inlet holes 3 and flows in pattern 5.

On the other hand, insertion of the battery pack 19 into the insertion hole 8 closes the terminal holes 4, thereby interrupting air flowing in patterns 6. In this condition, air flowing in patterns 5 effectively cools down the circuit components 25. The air flowing in patterns 6 disturbs the air flowing in patterns 5 and thus lowers the cooling effect attained by the air flowing in patterns 5.

In view of the foregoing, it is an object of the invention to assure cooling of circuit components contained in a DC power source unit regardless of whether or not a battery pack is inserted into an insertion hole.

To achieve the above and other objects, there is provided a DC power source unit that is capable of maintaining air flow generated by a cooling fan unchanged regardless of whether or not the battery pack is accommodated in the battery pack insertion hole. The housing is formed with an air inlet portion and an air outlet portion, preferably in a confronting relation. The housing is further formed with a battery pack insertion hole. There is provided means for defining a battery pack accommodating space for accommodating a battery pack inserted from the battery pack insertion hole. A substrate is disposed inside the housing. Circuit components are mounted on the substrate and disposed in the main inner space of the housing that is different from the battery pack accommodating space. The circuit components are mutually connected together to generate charging power to be supplied to the battery pack and DC power to be supplied via an adapter to the power tool for driving. The battery pack is used as an alternative power source of the power tool and charged by the charging power when inserted from the battery pack insertion hole and accommodated in the battery pack insertion space. Air flow generating means, such as a cooling fan, is disposed in the main space for generating air flow to cool down the circuit components. Air flow maintaining means is provided for maintaining the air flow at substantially constant regardless of whether or not the battery pack is accommodated in the battery pack accommodating space. The air flow maintaining means maintains a speed of the air flow at substantially constant and also maintains a volume of air per a unit time at substantially constant.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE PREFERRED EMBODIMENTS

Figure 3:
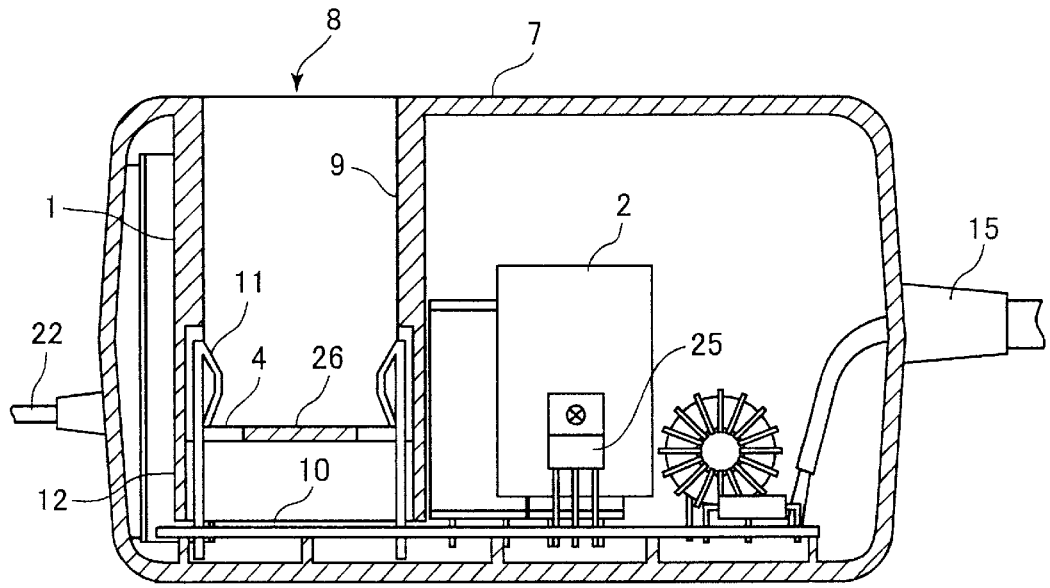
FIG. 3 is a vertical cross-sectional view showing the inner arrangement of the DC power source unit according to a first embodiment of the invention.

A first preferred embodiment of the invention will now be described with reference to FIG. 3.

Figure 1:
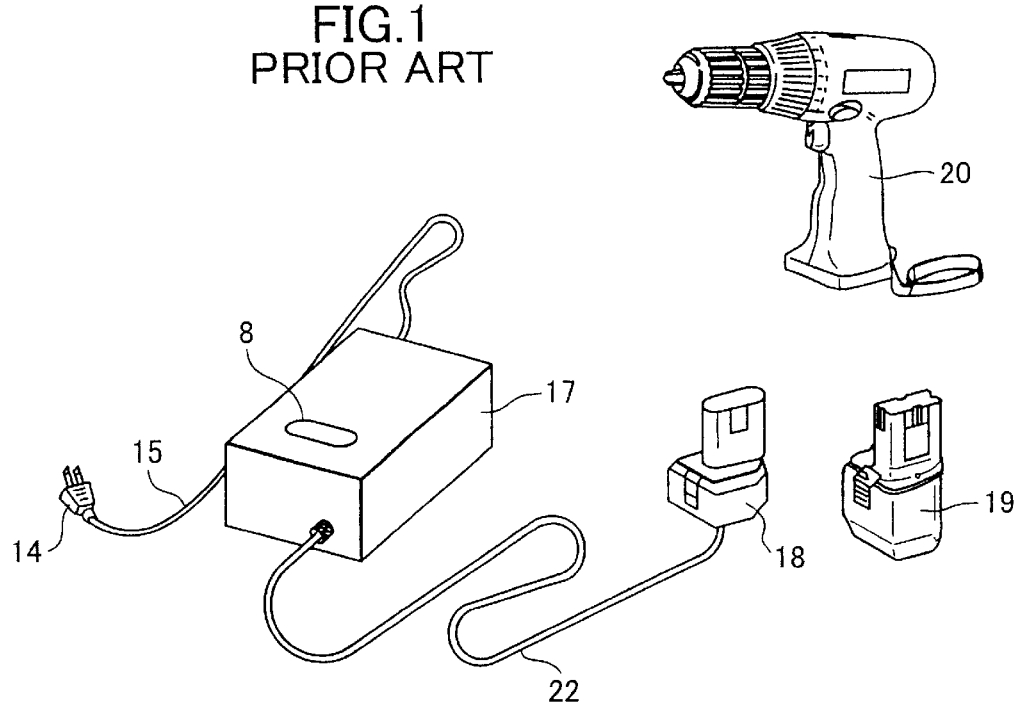
FIG. 1 is a perspective view showing a power tool, a battery pack, and a conventional DC power source unit with a charging function.
Figure 2:
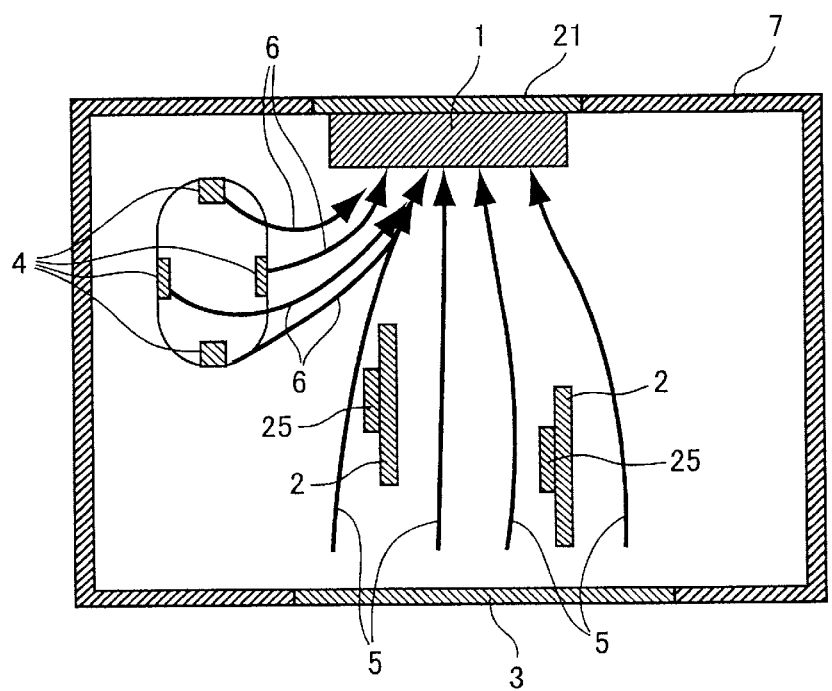
FIG. 2 is a cross-sectional top view showing the inner arrangement of the DC power source unit shown in FIG. 1 and illustrating patterns in which cooling air flows.

The DC power source unit has a battery charging function and a DC power generating function. The battery pack 19 as shown in FIG. 1 is used as a power source of the cordless power tool and charged by the DC power source unit. The DC power source unit can also supply DC power to the power tool through an adapter as described with reference to FIG. 1.

The outer appearance of the DC power source unit according to the first embodiment is substantially the same as that of the conventional DC power source unit shown in FIG. 1. That is, the housing 7 of the DC power source unit of the first embodiment is also substantially in a rectangular box shape. The upper wall of the housing 7 is formed with a battery pack insertion hole 5. Although not shown in FIG. 3, the side wall of the housing 7 is formed with air inlet holes and air outlet holes in a confronting relation similar to that shown in FIG. 1. A substrate 10 is disposed on the bottom wall of the housing 7.

The battery pack insertion hole 8 is substantially an elongated circular shape slightly larger than and similar to the cross-sectional shape of the leg portion of the battery pack 19. The battery pack 19 can only be inserted into the insertion hole 8 when oriented in a predetermined direction. That is, the shape of the battery pack insertion hole 8 does not allow the battery pack 19 to insert with different orientation.

A compartment wall 9 extends vertically downwardly from the battery pack insertion hole 8. A compartment bottom wall 26, which extends horizontally from the lower end of the compartment wall 9, is formed integral with the compartment wall 9. The compartment wall 9 and the compartment bottom wall 26 define a battery pack accommodating space which occupies a part of the inner space of the housing 7. Thus, the vertical length of the compartment wall 9 is substantially equal to the length of the leg portion of the battery pack 19.

Typically, four electrode engagement holes 4 are formed in the lower portions of the battery pack accommodating space. A recess formed in the lower portion of the compartment wall 9 and a cut-away portion in the bottom wall 26 form each electrode engagement hole 4. The electrode engagement holes 4 allow terminals 11 derived from the substrate 10 to pass through and penetrate into the battery pack accommodating space. The electrodes of the battery pack inserted into the battery pack insertion hole 8 are brought into contact with the corresponding terminals 11 in the battery pack accommodating space. The electrodes on the battery pack include positive and negative electrodes of the battery and electrodes of thermistor and thermostat. The thermistor and thermostat provide information about the temperature of the battery, based on which whether the battery pack is fully charged or not is determined.

A cylindrical-shape shielding wall 12 joins the lower portion of the compartment wall 9 and further extends vertically downwardly to a position just above the substrate 10. The housing 7, the compartment wall 9, and the shielding wall 12 are integrally formed.

The terminals 11 derived from the substrate 10 penetrate into the battery pack accommodating space through the electrode engagement holes 4. The terminals 11 protrude horizontally inward and are exposed in the battery pack accommodating space to enable connection with the corresponding electrodes of the battery pack 19.

A cooling fan 1 is disposed in the inner space of the housing 7 and generates air flow to most effectively cool down circuit components 25 mounted on the substrate 10 and a cooling fin 2. The shielding wall 12 and the substrate 10 interrupt the air flow patterns which would otherwise be created in the space between the electrode engagement hole 4 and the cooling fan 1.

The circuit components 25 are mutually connected together to generate charging power to be supplied to the battery pack and DC power to be supplied to the cordless power tool via a cord 22 and the adapter.

With the internal structure of the DC power supply unit, air flow generated by the cooling fan 1 remains substantially unchanged regardless of whether or not the battery pack is accommodated in the battery pack insertion space. More specifically, a speed of the air flowing in the internal space of the housing 7 is maintained at substantially constant. Also, the volume of air per a unit time is maintained at substantially constant. Accordingly, a small-size cooling fan 1 suffices to cool the circuit components. As a result, the DC power source unit per se can be compact in size and manufactured at low cost.

Figure 4:
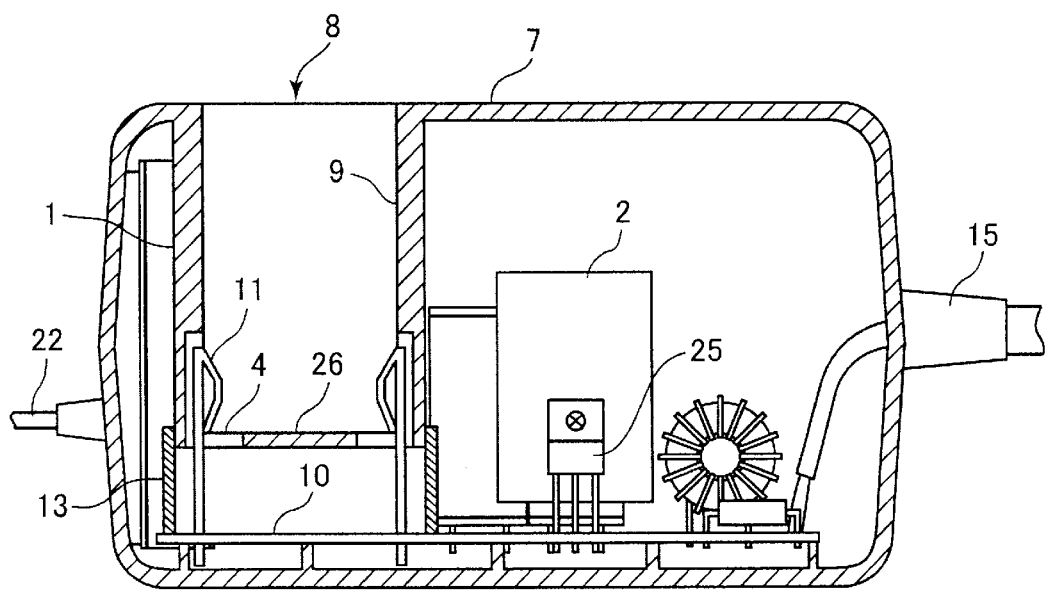
FIG. 4 is a vertical cross-sectional view showing the inner arrangement of the DC power source unit according to a second embodiment of the invention.

Next, a second embodiment of the invention will be described with reference to FIG. 4. The second embodiment differs from the first embodiment in that a cylindrical flow shielding member 13 is force-fitted to the lower end and outer periphery of the compartment wall 9. The flow shielding member 13 has a vertical length longer than the distance from the upper surface of the substrate 10 and the lower end of the compartment wall 9. Desiccating agent is coated on the surface of the substrate 10 to maintain a dry condition. The overall thickness of the substrate 10, including the thickness of the desiccating agent coating layer, varies at the time of manufacturing. However, this variation in the thickness of the substrate 10 can be compensated for by the flow shield member 13.

Although the present invention has been described with respect to specific embodiments, it will be appreciated by one skilled in the art that a variety of changes may be made without departing from the scope of the invention. For example, the flow shield 13 as employed in the second embodiment of the invention can be in the form of bellows with soft resiliency. By urging such flow shield against the substrate 10, the air flowing through the terminal holes 4 can be completely closed. Further, the substrate 10 has been described to be placed on the bottom wall of the housing 7, it can be placed anywhere as far as the mounting place is inside the housing 7. The place where the cooling fan 1 is set is not restricted either.

As described, the terminal holes formed in the lower portions of the battery pack insertion space are shielded or closed, cooling air introduced from the air inlet holes into the housing 7 and discharged out to the housing 7 through the air outlet holes is not affected regardless of whether or not the battery pack is inserted Into the insertion hole 8. That is, the speed of the cooling air is not lowered and the amount of cooling air is not reduced as a result of shielding effects. Accordingly, cooling the circuit components is assured with the cooling system.

What is claimed is:

1. A DC power source unit used as a power source of a power tool, comprising:

a housing formed with an air inlet portion, an air outlet portion, and a battery pack insertion hole;

means for defining a battery pack accommodating space for accommodating a battery pack inserted into the battery pack insertion hole, the inner space of the housing being divided into the battery pack accommodating space and a main space;

a substrate;

circuit components mounted on the substrate, disposed in the main space, and mutually connected together to generate charging power to be supplied to the battery pack and DC power to be supplied via an adapter to the power tool for driving, the battery pack being used as an alternative power source of the power tool and charged by the charging power when inserted into the battery pack insertion hole and accommodated in the battery pack insertion space;

air flow generating means, disposed in the main space, for generating air flow to cool down the circuit components; and air flow maintaining means for maintaining the air flow at substantially constant regardless of whether or not the battery pack is accommodated in the battery pack accommodating space.

2. The DC power source unit according to claim 1, wherein the air flow maintaining means comprises shielding means for shielding the battery pack insertion space from the main space of the housing.

3. The DC power source unit according to claim 2, wherein the shielding means maintains a speed of the air flow at substantially constant.

4. The DC power source unit according to claim 2, wherein the shielding means maintains a volume of air per a unit time at substantially constant.

5. A DC power source unit used as a power source of a power tool, comprising:

a housing formed with an air inlet portion, an air outlet portion, and a battery pack insertion hole;

a compartment wall for defining a battery pack accommodating space for accommodating a battery pack inserted into the battery pack Insertion hole, the compartment wall having a compartment side wall and a compartment bottom wall, at least two electrode engagement holes being formed in the compartment wall, the battery pack accommodating space occupying a part of the inner space of the housing;

a shielding member for shielding the battery pack insertion space from a remaining part of the inner space of the housing;

a substrate;

circuit components mounted on the substrate, disposed in the remaining part of the inner space, and mutually connected together to generate charging power to be supplied to the battery pack and DC power to be supplied to the cordless power tool via an adapter, the battery pack being used as an alternative power source of the power tool and charged by the charging power when inserted into the battery pack insertion hole and accommodated in the battery pack insertion space;

a cooling fan, disposed in the remaining part of the inner space, for generating air flow to cool down the circuit components, the air flow being generated by introducing air into the housing through the air inlet portion and discharging the air out to the housing through the air outlet portion; and at least two terminals derived from the substrate and penetrated into the battery pack accommodating space through the at least two electrode engagement holes, the at least two terminals being exposed in the battery pack accommodating space so as to be connected to respective ones of the at least two electrodes of the battery pack, whereby the air flow generated by the cooling fan remains substantially unchanged regardless of whether or not the battery pack is accommodated in the battery pack insertion hole.

6. The DC power source unit according to claim 5, wherein the shielding member is provided between the compartment side wall and the substrate.

7. The DC power source unit according to claim 5, wherein the shielding member is integral with the housing.

8. The DC power source unit according to claim 5, wherein the shielding member is provided between a first position in the vicinity of the at least two electrode engagement holes and a second position immediately above the substrate, and has a shape such that a space above the substrate and surrounded by the shielding member is substantially in a cylindrical shape.

* * * * *